Patented Feb. 19, 1952

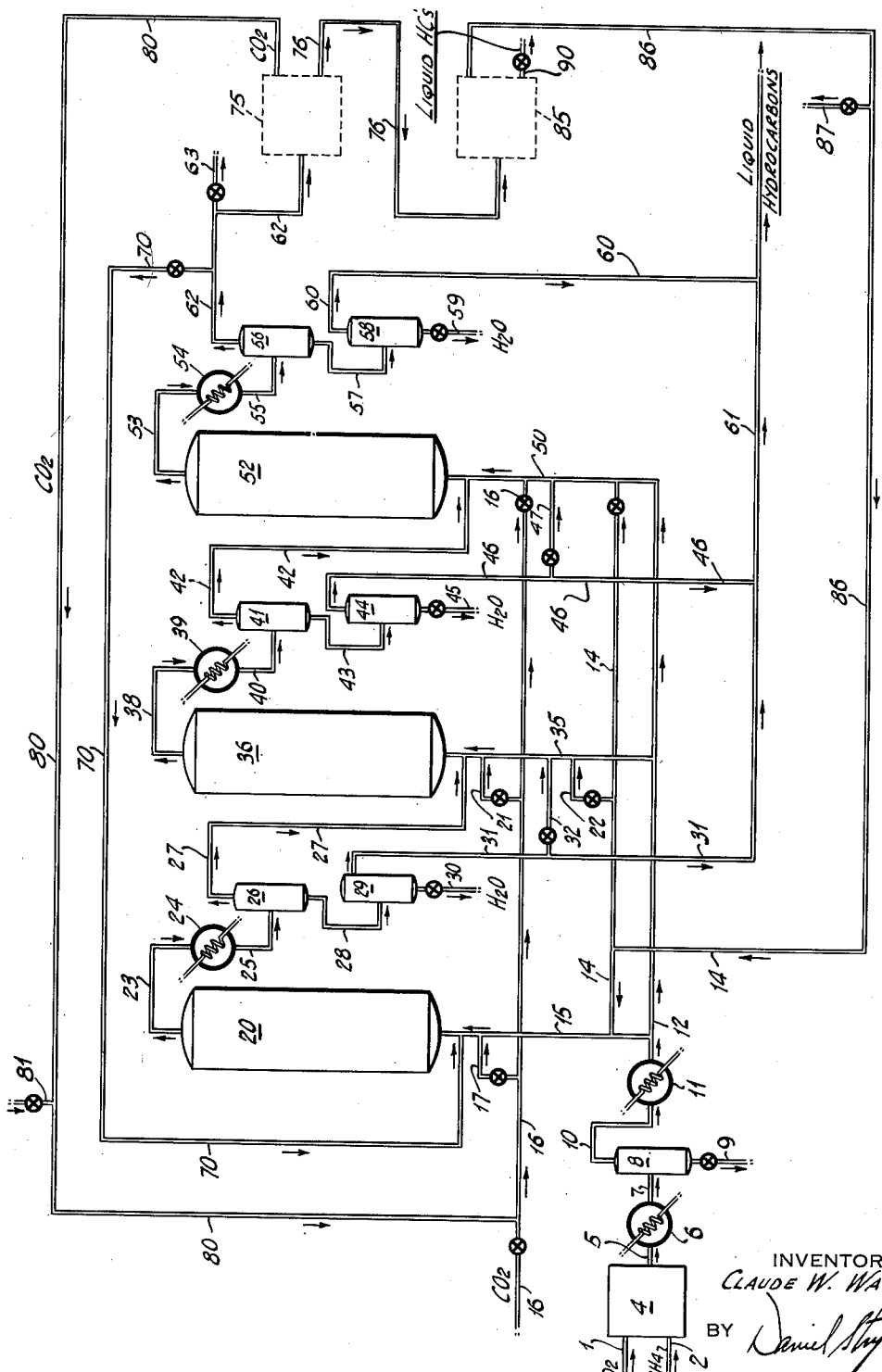

UNITED STATES PATENT OFFICE 2,585,981

PROCESS FOR CATALYTIC CONVERSION OF CARBON OXIDES

Claude W. Watson, Scarsdale, N. Y., assignor to The Texas Company, New York, N. Y., a corporation of Delaware Application November 23, 1945, Serial No. 630,521

1 Claim. (Cl. 260—449.6)

This invention relates to the catalytic conversion of carbon monoxide and hydrogen into hydrocarbons, oxygenated hydrocarbons and the like.

The invention contemplates effecting the synthesis reaction in a plurality of reaction stages, each stage containing synthesis catalyst. Carbon monoxide and hydrogen are passed in contact with the catalyst in each stage under conditions so as to effect substantial conversion into the desired product. An effluent stream of reaction products containing carbon dioxide and water is removed from each stage. Water is removed from each effluent stream and also some hydrocarbons, if desired, following which each residual effluent stream, or fraction thereof, containing carbon dioxide in substantal amount is passed to its respective succeeding stage in the series. The effluent stream from the final stage is treated to remove carbon dioxide, water and desired products of reaction, and the removed carbon dioxide is recycled advantageously to the initial stage of the series.

More specifically, the invention contemplates effecting the synthesis reaction in a plurality of stages or zones. Synthesis feed gas, containing carbon monoxide, carbon dioxide and hydrogen, and substantially free from water, is separately charged to each stage or zone in parallel flow. Residual gases from which water has been removed and which contain carbon dioxide, unreacted carbon monoxide and hydrogen, as well as substantially water-free products of reaction, if desired, flow from a preceding stage to a succeeding stage in series flow. Provision is made for removal of water from the reactants between stages so as to maintain the overall concentration of water in the reaction system as low as desired, particularly when employing the process for the production of hydrocarbons. The number of stages employed may range from two to about seven.

In my co-pending application Serial No. 626,425, filed November 2, 1945, now U. S. Patent 2,486,894, issued November 1, 1949, I have disclosed effecting hydrogenation of carbon monoxide in the presence of added carbon dioxide and under specified conditions of temperature such as to suppress methane formation and also such as to materially reduce the net production of carbon dioxide from the process. As there disclosed, it is advantageous to maintain the ratio of mols of hydrogen to mols of carbon monoxide plus carbon dioxide passing to the reaction zone not greater than 1, and preferably not less than 0.6.

In addition to maintaining the foregoing molar ratio not exceeding 1, the present invention also involves maintaining the molar ratio

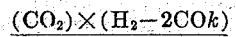

of reactants passing to the reaction zone substantially greater than, for example, approximately twice as great as the numerical value of the equilibrium constant for the water gas shift reaction $(CO+H_2O=CO_2+H_2)$ at the temperature prevailing in the reaction zone or stage, where $k$ is the fraction of the carbon monoxide which will be converted in that stage. This fraction converted may range from 0.95 to 0.995.

The equilibrium constant K can be expressed as $K=0.0202e$ with the exponent $$\frac{7350}{T+400}$$

where $e$ is the base of Napierian logarithms, e. g., 2.7183, and T is the reaction temperature in degrees Fahrenheit.

The value of K ranges from 70 for a reaction temperature of about 500° F. to a value of 16 for a reaction temperature of about 700° F., and is about 31 for a reaction temperature of about 600° F.

When the reactants are subjected to contact with a catalyst comprising iron powder in a state of dense phase fluidization at a temperature of about 600° F., this second ratio should be maintained at least in the range of 60 and above, and advantageously in the range of about 100 to 160.

By operating under the aforesaid conditions, the present invention provides a means for realizing a much greater conversion of the available carbon in the synthesis feed gas into desirable compounds, for example $C_2$ and higher molecular weight hydrocarbons, than has been achieved in the conventional manner. Thus, it is contemplated effecting substantially complete conversion in each stage of the carbon monoxide passing thereto, for example about 99% conversion. However, operating conditions may be regulated if desired so that from 95 to 99.5% conversion is effected in each stage.

The invention not only contemplates avoiding substantially entirely the net production of carbon dioxide from the conversion process at which is being charged synthesis gas containing at least 2 mols of hydrogen per mol of carbon monoxide, but also contemplates maintaining conditions such that carbon dioxide is actually consumed in the reaction.

The amount of carbon dioxide added or recycled to a reaction stage depends upon the composition of the synthesis feed gas passing thereto. Thus, if the hydrogen present is less than that theoretically required to react with the carbon monoxide present to produce olefins and water, then the amount of carbon dioxide added or recycled is less since carbon dioxide is of necessity produced in the reaction under such conditions.

In conventional practice, the synthesis of hydrocarbons from carbon monoxide and hydrogen is accompanied by the formation of large amounts of carbon dioxide and methane as well as water. Carbon dioxide so produced apparently results in some measure from the carbiding reaction between the catalyst metal and carbon monoxide, which reaction is regarded as an essential one in the synthesis from the stand-point of maintaining an excess of the carbide in the reaction.

A feature of my invention involves effecting consumption of the carbon dioxide so produced in this carbiding reaction by reacting it with available hydrogen to form additional carbon monoxide for use in the synthesis and thus maintain a high concentration of carbon monoxide in the synthesis reaction zone. Hydrogen may be added so as to assure the presence of desired hydrogen in the reaction.

However, water is also a product of the reaction between carbon dioxide and hydrogen, and water is also formed to a large extent by other reactions taking place during the course of the synthesis. Therefore, I contemplate removing water from the system substantially as rapidly as formed. By thus decreasing the concentration of water in the reaction system, the reaction between carbon dioxide and hydrogen is enhanced with consequent increase in the formation of carbon monoxide, which thus operates to maintain the desired high concentration of carbon monoxide in the reaction.

My invention has particular application to the synthesis of valuable hydrocarbons from carbon monoxide and hydrogen by contact with a fluidized powdered catalyst at temperatures in the range about 375 to 700° F. and under pressures which may range from atmospheric to several hundred atmospheres. With an iron catalyst it is advantageous to employ temperatures of about 550 to 600° F.

In carrying out the conversion with a fluidized catalyst for the production of hydrocarbons, a synthesis gas stream, advantageously containing at least 2 mols of hydrogen per mol of carbon monoxide, is continuously introduced to the lower portion of a vertical reaction vessel containing a mass of catalyst comprising, for example, iron powder of about 100 to 400 mesh, and having such particle size distribution as to assure maintaining uniform fluidization of the powder along the vertical dimension of the reactor. The reactant gas is caused to rise through the catalyst mass under conditions of flow sufficient to maintain fluidization of the catalyst. The catalyst is maintained under temperature and pressure such that conversion of carbon monoxide into hydrocarbons of higher molecular weight than methane occurs. The resulting products of reaction containing unreacted gas, carbon dioxide, water, and the desired molecular weight hydrocarbons are removed as an effluent stream from the upper portion of the reaction vessel.

Water is removed from the effluent stream and a gaseous or vapor fraction separated therefrom which contains carbon dioxide, unreacted carbon monoxide and hydrogen, and which may, if desired, contain at least some of the lower-boiling hydrocarbons. The resulting residual gaseous or vapor fraction, substantially free from water and containing carbon dioxide, is passed to the lower portion of a succeeding reaction vessel to which is also passed a stream of fresh synthesis feed gas, as will be described later with reference to the accompanying drawing.

Carbon dioxide is separated from the effluent stream leaving the final reactor in the series, and recycled to the initial reactor. If desired, portions thereof may be recycled to any one or all of the succeeding reactors. Additional hydrogen may be added to any one or more of the reactors.

The amount of carbon dioxide and hydrogen introduced to each reactor is regulated so as to maintain the previously mentioned molar ratios with respect to the components of the reactant mixture passing to each reactor.

By way of illustration, carbon monoxide and hydrogen are subjected to contact with a fluidized iron catalyst at a temperature of approximately 600° F. and under a pressure of approximately 200 pounds per square inch gauge. In Case I, the feed to the reactor contains about 5.8 mol per cent carbon dioxide, and in Case II, the feed contains about 26.6 mol per cent of carbon dioxide. The following tabulation compares the molar relationships at the inlet to the reaction stage in each case and also the yields.

| | Case I | Case II |
|---|---|---|
| $\dfrac{\text{Mols of } H_2}{\text{Mols of } CO+CO_2}$ | 2.22 | 0.63 |
| $\dfrac{CO_2 \times (H_2 - 2CO_k)}{CO \times H_2O}$ | 16 | 164 |
| Yields in cubic centimeter per cubic meter of fresh feed: | | |
| C₃ and heavier hydrocarbons | 179 | 222 |
| Water | 167 | 258 |
| Water soluble oxygenated compounds | 9 | 29 |

| Yields as mol per cent of carbon monoxide converted | Case I | Case II |
|---|---|---|
| CO₂ | 20.9 | −13.9 |
| C₁+C₂ hydrocarbons | 16.6 | 3.6 |
| C₃ and heavier hydrocarbons | 60.2 | 100.7 |
| Water soluble oxygenated compounds | 2.3 | 5.5 |
| | 100.0 | 95.9 |

From the foregoing tabulation, it is apparent that the addition of a substantial quantity of carbon dioxide to the reactor feed eliminates the net production of carbon dioxide, and materially reduces the formation of methane. Actually in Case II, carbon dioxide is consumed as indicated by a net disappearance of carbon dioxide to the extent of 13.9 mol per cent. The yield of C₃ and heavier hydrocarbons is very much larger than in Case I where the feed contained a relatively small concentration of carbon dioxide, namely about 5.8 mol per cent.

Reference will now be made to the accompanying drawing which comprises a diagram of flow illustrating one mode of practicing the process of my invention.

Oxygen or a gas containing a high percentage of molecular oxygen is obtained from a source not shown through a pipe 1 and is introduced into a synthesis gas generator 4. Under certain operating conditions in the synthesis reactors, it is possible to use air for the oxidative combustion. Therefore, the possibility of using air for the combustion in the synthesis gas generator is included within the scope of the invention. In most operations, however, the oxidizing gas introduced into the generator contains over 75% molecular oxygen.

A hydrocarbon gas, which is ordinarily mainly methane, is obtained from a source not shown through a pipe 2 and introduced into the generator 4.

In the generator 4, the hydrocarbon gas, which will henceforth be referred to as methane for the sake of simplicity, undergoes controlled oxidative combustion to form synthesis gas containing carbon monoxide and hydrogen in the approximate mol ratio of 1:2. Various types of synthesis gas generators may be employed to effect this controlled oxidative combustion.

Other means of preparing synthesis gas may be used such as the reaction between coke and steam.

The synthesis gas usually contains a small percentage of carbon dioxide and may also contain steam as it issues from the generator 4. The synthesis gas, which is at a high temperature after the oxidative combustion, is introduced through a pipe 5 into a heat exchanger 6 wherein the steam present in the synthesis gas is condensed. The condensed steam is separated from the gases in a gas-liquid separator 8 into which it is introduced through a pipe 7. The water is drawn off through an exit pipe 9. The synthesis gas, together with the small percentage of carbon dioxide present therein, leaves the gas-liquid separator 8 through a pipe 10 and passes through the heat exchanger 11 wherein it is reheated to the desired temperature. The temperature to which the synthesis gas is preheated may be reduced after the unit is on stream for a time.

The water content of the synthesis gas is at a minimum so that the desired ratio of reactants may be more readily attained. If the synthesis gas is saturated with water vapor at 100° F. and 250 pounds per square inch gauge, the water concentration is only about 0.4% by volume.

The synthesis gas at the desired reaction temperature leaves the heat exchanger 6 through a pipe 12. It is introduced into a plurality of reactors through this pipe 12 communicating with branch pipes 15, 35 and 50. The pipe 12 acts as a manifold dividing the total synthesis feed between the different reactors. The portion of feed introduced into each reactor is proportional to the number of stages; for example, in a system utilizing three stages, about 33% of the feed is introduced into each stage.

During the initiation or starting up of the reaction process, it is necessary to supply carbon dioxide from an extraneous source in order to maintain the mol per cent of carbon dioxide in the reactor feed to the primary stage which will satisfy the equations which have been specified previously, since recycle carbon dioxide may not be available during the starting-up period. A convenient source of carbon dioxide is provided if the hydrogen for the reduction of the catalyst is prepared by subjecting a portion of synthesis gas obtained from the generator 4 to reaction with steam at an elevated temperature and pressure so that the water gas-shift reaction occurs. Carbon dioxide formed in this reaction may be separated from the hydrogen through a conventional absorption system and after being stripped from the absorbent may be used to supply the necessary concentration of carbon dioxide needed during the initiation of the reaction.

Carbon dioxide so obtained passes along a pipe 16 which serves as a $CO_2$-manifold for all of the reactors. Usually the carbon dioxide is introduced in its entirety into the primary reactor 20 through a pipe 17, which branches off from pipe 16. After the reaction has proceeded for a considerable time so that there is accumulated enough gas to be recycled, the concentration of carbon dioxide in the reactor feed is maintained through recycle streams which are returned to the $CO_2$-manifold pipe 16.

The concentration of hydrogen is maintained at the concentration level prescribed by the previously established ratios by introducing hydrogen through a $H_2$-manifold pipe 14 through which the $H_2$ may be introduced into each of the reactors. Usually a major portion of the $H_2$ is introduced into the primary reactor feed line 15 from the $H_2$-manifold pipe 14. After the unit has been in operation for a time, the hydrogen concentration in the reactor feed is maintained through a recycle stream which is returned to manifold pipe 14.

The reactor feed, as introduced into the reactor 20, thus contains hydrogen, carbon monoxide and carbon dioxide in the concentrations which will satisfy the relationships which have been prescribed for them previously.

During passage through the reactor 20, carbon monoxide and hydrogen present in the reactor feed are converted into the desired products. The products of the catalytic conversion comprising normally gaseous hydrocarbons and normally liquid hydrocarbons and also water, together with the excess hydrogen and carbon dioxide, leave the reactor 20 through a pipe 23. The effluent passes along the pipe 23 to a heat exchanger 24 in which steam and the normally liquid products of the reaction are condensed. The total effluent leaves the heat exchanger 24 through a pipe 25 and is introduced into a gas-liquid separator 26.

In the gas-liquid separator 26, the gaseous constituents of the effluent, such as carbon dioxide, hydrogen and the normally gaseous hydrocarbon products of the reaction, which are mainly normally gaseous olefins, since the formation of methane has been substantially reduced by the conditions of operation of this invention, are separated from the condensed steam and normally liquid hydrocarbon products. The gaseous components leave the gas-liquid separator through a pipe 27.

The liquid components pass out of the bottom portion of the separator 26 through a pipe 28 and flow into a decanter 29. In the decanter 29, the water is separated from the normally liquid hydrocarbons and is discharged through a pipe 30.

The normally liquid hydrocarbons leave the decanter 29 through a pipe 31 and thereafter join with the liquid hydrocarbons produced in the other reactors. It is possible, if desired, to introduce a portion of the normally liquid hydrocarbons formed in the conversion in the primary stage to a succeeding stage to aid in effecting temperature control by a process of evaporative cooling. This may be accomplished by passing a portion of the normally liquid hydrocarbons from the pipe 31 into a pipe 32 which connects with a pipe 35 which is the feed line to the secondary reactor. Other means of removing the heat of reaction are usually preferred when employing a fluidized catalyst such as internal cooling element, for example, through which a fluid heat carrier flows in indirect heat exchange relationship with the catalyst.

The gaseous components of the effluent, comprising normally gaseous hydrocarbons and the excess quantities of carbon dioxide and hydrogen which have directed the reaction in the primary reactor 20 towards the formation of desired compounds, pass along the pipe 27 until they reach the pipe 35 which serves as the feed pipe for a secondary reactor 36. The pipe 35 connects with the manifold pipe 12 through which the total synthesis gas is distributed to the various stages of the reaction.

The addition of the gaseous stream to the synthesis gas maintains the concentrations of hydrogen, carbon monoxide and carbon dioxide in the specified ratios. Since the water formed in the primary stage has been condensed and removed, the water content of the reactor feed is still negligible, being merely the vapor pressure of water remaining after the condensation in the heat exchanger 24. Additional carbon dioxide, if needed, may be obtained through a branch pipe 21 which connects with $CO_2$-manifold pipe 16. Additional hydrogen, if needed, may be obtained through a branch pipe 22 which connects with $H_2$-manifold pipe 14.

At least the major portion of the carbon dioxide and hydrogen which must be added to the synthesis gas in order to maintain the prescribed ratios of concentrations is supplied to the secondary reactor from the gaseous components of the effluent from the first. Thereby, the total quantities of carbon dioxide and hydrogen necessary to preserve the concentrations of components in the prescribed ratios are reduced for the overall conversion of synthesis gas.

The reactor feed containing the constituents in the prescribed concentration ratio enters the secondary reactor 36 through the pipe 35. The reactants undergo conversion therein which is directed towards the formation of desired products by the elimination of the net production of carbon dioxide and the material reduction of the formation of methane.

The effluent containing the products of reaction, excess carbon dioxide and excess hydrogen leaves the reactor 36 through a pipe 38. The effluent then undergoes treatment which is analogous to that which the effluent from the primary reactor 20 undergoes. The effluent passes into a heat exchanger 39 wherein the steam and normally liquid constituents are condensed. The effluent then passes to a gas-liquid separator 41 through a pipe 40. In the gas-liquid separator 41, the gaseous components of the effluent are separated from the condensed hydrocarbons and water. These gaseous components leave the separator 41 through a pipe 42.

The condensed portion of effluent passes into a decanter 44 through a pipe 43. In the decanter 44, the water is separated from the liquid hydrocarbons and is discharged through a pipe 45.

The liquid hydrocarbons leave the decanter 44 through a pipe 46 and thereafter join with the liquid hydrocarbons which are separated from the primary reactor effluent. Provision may also be made for introducing a portion of the liquid hydrocarbons into the third reactor to serve as an evaporative coolant by passing a portion of the liquid hydrocarbons from the pipe 46 along a pipe 47 which leads into a pipe 50 which is the feed line to the tertiary reactor.

The gaseous components of the effluent pass along the pipe 42 which leads into a pipe 50 which serves as the feed line for the tertiary reactor 52. The gaseous constituents comprise excess carbon dioxide and hydrogen which latter two have directed the course of the conversion towards the desired products in both of the previous stages. The carbon dioxide and hydrogen in this gaseous stream serve to maintain the desired ratio of reactant concentrations for the third stage of conversion.

The synthesis gas from the generator 4 enters the feed pipe 50 from the manifold pipe 12. Therein it is joined by the gaseous portion of the effluent from the secondary reactor 36. Additional carbon dioxide, if needed, may be added to the reactor feed from the $CO_2$-manifold pipe 16. Additional hydrogen, if needed, may be added to the reactor feed from the $H_2$-manifold pipe 14. In the reactor 52, the reactants are converted into desired valuable products with substantially no net production of carbon dioxide and only limited formation of methane.

The reactor feed in each succeeding stage is increased by the quantity of gaseous hydrocarbons formed in the preceding stage. Since it is desirable to conduct the conversion at equivalent velocities in all the stages, it is advantageous to slightly enlarge the reactor in each succeeding stage. The extent of this enlargement may be calculated from the desired linear velocity and the increment in the reactor feed which is effected by the addition of gaseous hydrocarbons to each stage.

The effluent leaves the reactor 52 through a pipe 53. The effluent proceeds therealong to a condenser 54 in which liquid hydrocarbons and steam are condensed. The effluent then passes into a gas-liquid separator 56 through a pipe 55. The gaseous components are separated from the condensed portion of the effluent therein. The gaseous components leave the separator 56 through a pipe 62. Further treatment of this gaseous fraction will be described in detail later.

The condensed portion of the effluent passes into a decanter 58 through a pipe 57. In the decanter 58, water is separated from the liquid hydrocarbons and is discharged through a pipe 59.

The liquid hydrocarbons leave the decanter 58 through a pipe 60 and pass therealong until they pass into a manifold pipe 61 into which the liquid hydrocarbons from primary and secondary reactors also flow. The combined liquid hydrocarbons may be subjected to conventional stabilization and fractionation, not shown, or to such other treatment as may be desired. The gases separated from the liquid hydrocarbons in the stabilization can be introduced into the polymerization unit which will be described later.

Returning to the gaseous components of the effluent from the tertiary reactor 52 which have left the separator 56 through a pipe 62, they comprise excess carbon dioxide, excess hydrogen and all of the normally gaseous hydrocarbons which have been formed in all three stages of the catalytic conversion. The gaseous stream is separated into two streams.

One portion, known as "wet" gas, passes along a pipe 70 which branches off from the pipe 62. This "wet" gas, comprising carbon dioxide, hydrogen and normally gaseous hydrocarbons, such as propane, butane and pentane, with minor quantities of $C_1$ to $C_2$ hydrocarbons, is recycled to the primary reactor 20. By returning this "wet" gas, a portion of the carbon dioxide and hydrogen required to supply the necessary concentrations are provided.

A portion of the gas stream flowing through the pipe 62 may be vented or piped to storage through draw-off pipe 63.

The major portion of the gaseous fraction of the effluent passes along the pipe 62 into a carbon dioxide absorbing unit 75. Therein the carbon dioxide contained in the gaseous stream is absorbed in a suitable solvent such as a monoethanolamine solution. The gaseous hydrocarbons and hydrogen from which the carbon dioxide has been stripped leave the absorber 75 through a pipe 76. The further treatment of this material will be described in detail later.

Upon regeneration of the absorbent in a regenerator section of the absorbing unit 75, carbon dioxide is liberated and leaves the absorbing unit 75 through a pipe 80.

The carbon dioxide so liberated passes along the pipe 80 through which it is returned to the $CO_2$-manifold pipe 16. The carbon dioxide is raised to a required pressure prior to its return to the manifold pipe 16. A major portion of recycle carbon dioxide is returned to the primary reactor 20 through the branch pipe 17 which connects the manifold pipe 16 with the primary reactor feed line 15. By this method, a concentrated source of carbon dioxide is provided by which the concentration of carbon dioxide in the feed to the primary reactor may be maintained at the necessary level. Provision is made for introducing portions of this carbon dioxide as needed into the secondary and tertiary reactors as has been previously described. Excess carbon dioxide may be vented through a vent 81.

The gaseous hydrocarbons and excess hydrogen which have left the $CO_2$-absorber 75 through the pipe 76 pass therealong to a polymerization unit 85. The gaseous hydrocarbons which have been separated from the liquid hydrocarbons by stabilization may also be introduced into the polymerization unit 85. In the polymerization unit 85, the olefins present in the gaseous hydrocarbons are polymerized by contact with a suitable catalyst such as phosphoric acid on silica. As a result of this polymerization process, the gaseous olefin hydrocarbons form liquid hydrocarbons.

A gaseous stream, comprising hydrogen, nitrogen, gaseous paraffins and unpolymerized olefins, leaves the polymerization unit 85 through a pipe 86. A portion of this gas stream is vented to fuel through a vent 87 in order to prevent the accumulation of nitrogen in the system. The desired portion of this $H_2$-rich gas stream passes along the pipe 86 until it reaches the pipe 14 which serves as the $H_2$-manifold for the three reactors. This $H_2$-rich gas stream is mostly diverted to the primary reactor 20 through the pipe 14 which leads into the primary reactor feed line 15 in order to maintain necessary $H_2$ concentration. Provision is made for introducing portions of the $H_2$-rich stream as needed into the secondary and tertiary reactors as has been previously described.

The liquid hydrocarbons which have been formed by the polymerization of the gaseous olefins leave the polymerization unit 85 through a pipe 90. Thereafter they are subjected to stabilization and fractionation so as to obtain component fractions such as gasoline, diesel oil, etc.

While specific reference has been made to employing a catalyst comprising iron, it is contemplated that other synthesis catalysts comprising a metal or metals from the iron group of the periodic system, i. e., cobalt, nickel, ruthenium etc. may be employed. The metal may be employed in association with a supporting or carrier material and also with suitable promoting agents, if desired.

An effective iron catalyst comprises iron powder of about 100 to 400 mesh containing about 1 to 2% of potassium oxide ($K_2O$) and about 2 to 3% alumina ($Al_2O_3$). Preferably all of the powder should pass through a 100 mesh screen and about 85% should pass through a 325 mesh screen.

Examples of other useful promoters are the oxides of thorium, magnesium, uranium and vanadium, while examples of supporting materials are diatomaceous earth, silica gel, Filtrols etc.

Thus an example of a supported catalyst would be one comprising about 32% cobalt, 64% Filter Cel and about 4% thorium and magnesium oxides.

It is also contemplated that other than fluidized catalyst systems may be used. The catalyst may be employed in either stationary or moving bed form.

Obviously many modifications and variations of the invention, as hereinbefore set forth, may be made without departing from the spirit and scope thereof and, therefore, only such limitations should be imposed as are indicated in the appended claim.

I claim:

The process for the production of desired hydrocarbons, oxygenated hydrocarbons and mixtures thereof by the catalytic hydrogenation of carbon monoxide with the conversion of substantially all of the feed carbon monoxide into said desired products and with repressed formation of carbon dioxide, which comprises feeding a gaseous mixture of carbon monoxide, hydrogen, water vapor and carbon dioxide through a reaction zone containing a fluidized solid particle, iron, hydrocarbon synthesis catalyst, contacting said gaseous mixture with said fluidized catalyst at a reaction temperature in the range about 550–700° F., until about 0.95 to about 0.995 of said feed carbon monoxide has been converted into desired products of reaction, maintaining the composition of said gaseous feed mixture such that the molar ratio of hydrogen to carbon monoxide is at least 2:1, the amount of water vapor is not more than that corresponding to saturation at 100° F., and the proportion of carbon dioxide is sufficient to repress action of the water gas shift reaction in that direction which consumes carbon monoxide and water vapor with the formation of carbon dioxide such that the conversion of the feed carbon monoxide into undesired carbon dioxide by the water-gas shift reaction is substantially inhibited, withdrawing effluent products of reaction from the reaction zone and recovering the desired products of reaction therefrom.

CLAUDE W. WATSON.

REFERENCES CITED

The following references are of record in the file of this patent:

UNITED STATES PATENTS

| Number | Name | Date |
|---|---|---|
| 2,213,415 | Slatineanu | Sept. 3, 1940 |
| 2,243,869 | Keith | June 3, 1941 |
| 2,244,196 | Herbert | June 3, 1941 |
| 2,248,099 | Linchk | July 8, 1941 |
| 2,257,293 | Dreyfus | Sept. 30, 1941 |
| 2,318,602 | Duftschmid et al. | May 11, 1943 |
| 2,347,682 | Gunness | May 2, 1944 |
| 2,351,248 | Wirth et al. | June 13, 1944 |
| 2,417,164 | Huber, Jr. | Mar. 11, 1947 |

OTHER REFERENCES

Haslam, R. T., and Russel, R. P., "Fuels and Their Combustion," First Edition (1926), published by McGraw-Hill, New York, pages 165–6 (2 pages).